United States Patent [19]

Frew

[11] 4,326,888
[45] Apr. 27, 1982

[54] ANTI-RUST COMPOSITION

[76] Inventor: Jeremy G. M. Frew, 30 Montgomery St., Edinburgh, Scotland

[21] Appl. No.: 80,932

[22] Filed: Oct. 1, 1979

[30] Foreign Application Priority Data

Jan. 13, 1977 [GB] United Kingdom ............... 1250/77

[51] Int. Cl.³ .................. C09D 5/08; C08L 25/04
[52] U.S. Cl. ......................... 106/14.14; 106/14.44; 523/177; 252/396; 524/319; 524/320; 428/461
[58] Field of Search ................... 106/14.14, 14.44; 260/29.6 BM, 29.6 ME, 29.6 MM, 29.6 RB; 428/461; 252/396

[56] References Cited

U.S. PATENT DOCUMENTS

| | | | |
|---|---|---|---|
| 3,502,149 | 3/1970 | Pence | 260/29.6 M |
| 3,728,267 | 4/1973 | Hirota et al. | 134/4 |
| 3,729,423 | 4/1973 | Hirota | 134/3 |
| 3,839,255 | 10/1974 | Poolas | 260/29.6 M |
| 4,002,571 | 1/1977 | Anderle et al. | 260/29.6 MM |
| 4,086,182 | 4/1978 | Hengelhaupt et al. | 252/181 |

Primary Examiner—Lorenzo B. Hayes
Attorney, Agent, or Firm—Mason, Fenwick & Lawrence

[57] ABSTRACT

An anti-rust composition comprising citric acid, a metal chloride and film forming material which when applied to a rusty substrate will convert the rust into a harmless reaction product and provide a coating for receiving a finish paint.

7 Claims, No Drawings

ANTI-RUST COMPOSITION

This invention relates to an anti-rust composition.

The rusting of iron and steel is a complex process and is not yet fully understood; nevertheless rust is a perennial problem, particularly in damp climates, and vast amounts of money are lost each year through the damage caused by rust.

It has previously been proposed to provide a paint which includes a water-insoluble or water-immiscible film-forming vehicle emulsified in an aqueous phase including phosphoric acid, the resulting paint having surface-protective properties and being capable of dissolving small amounts of rust. This previously proposed system is capable of removing only superficial rust, and leaves on the painted surface a phosphate deposit which can detrimentally affect the strength of welds made thereon. Furthermore, a large number of finish paints cannot be applied successfully to rust preventative coatings containing mineral acids, so that if the previously-proposed paint is used as a primer the range of finish paints which can be applied thereover is limited.

It is an object of the present invention to provide an anti-rust composition which, when applied to a rusty surface and dried, can be overpainted by a wide range of paints without further treatment, and which will render harmless the rust to which it is applied and protect against further rusting.

According to the present invention there is provided an anti-rust composition comprising critic acid, a metal chloride and film-forming material.

The mechanism of the rust removing or converting action of the present composition is not entirely clear, but it appears that the metal chloride acts as a catalyst or promoter for the action of the citric acid, thus speeding up reduction or complexation of the rust by the citric acid. The citric acid may reduce the ferric oxide of the rust to ferric and ferrous citrate or some other action may occur. Thus, the chloride ions may solubilize the rust forming iron chloride which can react with the citric acid to form iron citrate, releasing chloride ions for further reaction. In any case, the effect of citric acid on rust is distinctly improved in association with the metal chloride compared to citric acid alone The composition is generally in the form of an aqueous emulsion with the film-forming polymer being the disperse phase, and as the composition dries on the rusty surface the film-forming material forms a coating over the reacting citric acid and metal chloride, and the reaction products appear as a brown colouration on or within the coating. If the dried composition coating is left uncovered for some time moisture in the air reacts with the brown reaction products to darken them, but this does not affect the properties of the composition coating on the surface, which continues to act as a rust preventative.

A cooperation or coaction appears to take place in a way not at all presently understood, between the film-forming material and the complex reaction product of the rust, citric acid and metal chloride in the sense that the inventive compositions form a tough durable coating more effectively upon rusted surfaces than upon rust-free iron surfaces. In the latter case, the desired coating does eventually result but by that time the surface has had an opportunity to undergo rusting so as to produce in situ a stratum of rust for participation in the reaction.

Generally, the film-forming material is a polymeric material.

A particular use of the present composition is as a primer for conventional paint coatings, and for this purpose it is appropriate for the film-forming material to be an acrylic polymer, for example, polyacrylic, polymethlacrylic acid or polymethacrylic acid, or a vinyl-modified or styrene-modified acrylic resin, or an unmodified acrylic resin. A particularly effective primer is obtained by using Vinacryl 7175 styrene-modified acrylic resin, which contains about 49% of styrene and about 51% of acrylic monomer and which gives a tough, hard, flexible finish which is resistant to most chemicals and compares favourably with material used in conventional primers. Vinacryl 7175 is supplied as a dispersion of 48% resin in 52% of water. The styrene-modified acrylic resins are also of particular use in the present composition due to their ability to form stable emulsions in acidic aqueous environments.

The preferred metal chlorides to be used in the composition are those which have the greatest catalytic or promotive effect on the reaction of citric acid with the rust, preferably zinc chloride or chromous chloride. The most effective or preferred is zinc chloride. Aluminum chloride and magnesium chloride have also been found effective and stannous chloride should serve as well, to mention a few of the available water-soluble chloride salts that could be employed.

Further according to the invention there is provided a method of removing or converting rust from a substrate, comprising applying to the substrate a composition containing citric acid, a metal chloride and a film-forming material.

Embodiments of the present invention will now be described by way of illustration in the following Examples.

EXAMPLE 1

An anti-rust composition was prepared from the following three groups of ingredients:

| | Wt. lbs. | % Dry Wt. Basis | As % of resin, acid & chloride |
|---|---|---|---|
| Group 1 | | | |
| Cellulose gum CMC 7ML | 3.375 | 1.04 | |
| Cold water | 32.5 | — | |
| Group 2 | | | |
| Titanium dioxide RTC4 | 44 | 13.53 | |
| Vegetable black | 1.187 | 0.365 | |
| Vinacryl 7175 (48% resin solids) | 417.62 | 61.63 | 73.1 |
| Defoamer 1512M | 1.25 | 0.384 | |
| Grease dispersant and actuator (Surfynol 104H) | 1.25 | 0.384 | |
| Group 3 | | | |
| RAC (citric acid crystals) | 49 | 15.1 | 17.9 |
| RSA (zinc chloride) | 24.75 | 7.61 | 9.03 |
| Boiling water | 35 | — | |
| Total | 609.932 | 100.04 | 100.03 |
| (Total dry weight basis = 325.27) | | | |

The components of group 1 are stirred together thoroughly and allowed to stand from 12 to 24 hours. The components of group 2 are mixed together and high-speed dispersed until an even mixture is obtained. The components of group 3 are stirred together until a solution is obtained.

The group 3 solution is then added to the group 2 mixture and high-speed dispersed, and the group 1 components which have been stirred together and allowed to stand are added and high-speed dispersed.

The resulting emulsion can then be fed into containers through a shaker, for storage and transportation.

When the composition of this Example has been prepared, it is ready for application to a rusted substrate. The substrate should first be freed from oil and grease, and loosely adhering rust flakes should be removed. The composition can then be applied by, for example, brush or roller, or, after the addition of 10% of cold water as a thinner, by spraying. In each case the entire rusted portion of the substrate should be covered by the composition with care being taken to ensure that air-bubbles and pin-holes are precluded.

The composition can be removed from the brushes, rollers, spray guns, etc. by washing with water.

The time within which the composition dries is controlled by the amount of rust on the substrate as well as by environmental conditions, and the drying time is shorter on a rusty surface than on clean metal or painted surfaces, which denotes the cooperative action noted above. In warm dry conditions, the composition dries on a rusted surface in about 2 hours, but it takes about 7 to 10 days for the full reaction of the composition with the rust to be completed, after which time the maximum rust resistance of the composition is attained.

Once the composition has dried it can be overpainted with almost any air drying paint with the exception of water-based emulsions and water-soluble paints. The adhesion of paints such as synthetic enamels, chlorinated rubber paints, exposies, acrylic and hammer finishes and decorative and maintenance finishes to the acrylic film which forms on the treated surface is excellent.

The composition can also be used as a primer for stoving allowing rusty ferrous components to be stoved without the need for expensive pre-treatments such as shot blasting. In stoving, the final stoving cycle should be at a temperature of below 120° C.

The composition of this Example is non-inflammable and can be used to avoid the expensive step of halting continuous production processes in industry by eliminating the need for shot blasting or completely cleaning rusty equipment and structures in a factory. This is particularly important in factories where food and drink are prepared and packaged.

This composition also enables a smart attractive appearance to be regained even where rust has broken through previously-applied finishes.

EXAMPLE 2

An anti-rust composition was prepared from the following components:

|  | % Dry Wt. Basis | As % of resin, acid & chloride |
|---|---|---|
| Vinacryl 7175 (52% resin solids) | 77.3% | 63.9 | 69.65 |
| Citric acid | 10.3% | 16.4 | 17.9 |
| Zinc chloride | 7.2% | 11.45 | 12.48 |
| Isopropyl alcohol | 3.1% | 4.93 | |
| Xylene | 1.05% | 1.67 | |
| Dimethyl silicone | 1.05% | 1.67 | |
|  | 100 | 100.02 | 100.03 |

To prepare the composition, the citric acid and zinc chloride was added to the Vinacryl 7175 (which contains 48% of water), with stirring and heating as necessary to dissolve the citric acid and zinc chloride. The isopropyl alcohol, zylene and dimethyl silicone are then added as foam reducers and the mixture stirred or high-speed dispersed until an even emulsion is obtained.

A rusty substrate can be treated with this composition in similar manner to those described in Example 1.

The remaining Examples produce anti-rust compositions in emulsion from when the following ingredients are mixed together in a similar manner to that described in Example 2. The compositions obtained can be used to treat rusty substrates similarly to the composition of Example 1.

EXAMPLE 3

|  | % Dry Wt. Basis | As % of resin, acid & chloride |
|---|---|---|
| Vinacryl 7175 | 77.3% | 63.9 | 69.65 |
| Citric acid | 10.3% | 16.4 | 17.9 |
| Zinc chloride | 7.2% | 11.45 | 12.48 |
| Lithopone 30% | 5.2% | 8.27 | |
|  | 100 | 100.02 | 100.03 |

EXAMPLE 4

|  | % Dry Wt. Basis | As % of resin, acid & chloride |
|---|---|---|
| Polyacrylic acid | 19.3% | 45.95 | 52.45 |
| Water | 58.0% | — | |
| Citric acid | 10.3% | 24.52 | 27.99 |
| Zinc chloride | 7.2% | 17.14 | 19.56 |
| Gantrez 169 | 5.2% | 12.38 | |
|  | 100 | 99.99 | 100 |

EXAMPLE 5

|  | % Dry Wt. Basis | As % of resin, acid & chloride |
|---|---|---|
| Polymethylacrylic acid | 19.3% | 45.95 | 52.45 |
| Water | 58.0% | — | |
| Citric acid | 10.3% | 24.52 | 27.99 |
| Zinc chloride | 7.2% | 17.14 | 19.56 |
| Isopropyl alcohol | 3.1% | 7.38 | |
| Xylene | 1.05% | 2.5 | |
| Dimethyl silicone | 1.05% | 2.5 | |
|  | 100 | 99.99 | 100 |

The compositions of Examples 4 and 5 were less satisfactory than those of Examples 1, 2 and 3, giving on the substrate a rather brittle, nonplasticized film.

As can be deduced from the final column of the above Examples, the composition of the invention can contain, based on the dry weight of the film-forming material, citric acid, and metal chloride, about 50-75% film-forming material, about 20-30% citric acid and 10-20% of the metal chloride. The composition is normally applied under whatever ambient conditions may obtain for the particular iron metal surface being treated; the composition could be heated provided the temperature did not affect the stability of the emulsion or dispersion but such heating is not at all necessary to its performance to achieve the objectives of the invention.

What I claim is:

1. A composition for application to the rusted surface of a ferrous metal article to inactivate the rust thereon and prevent further rusting, which consists essentially of an aqueous dispersion or emulsion of a water-insoluble film-forming material forming after drying a tough durable adherent coating upon said surface, and dissolved in the aqueous phase of said emulsion citric acid and a water-soluble metal chloride in sufficient proportions to react in situ with the rust to form a reaction product therewith to inactivate the same and prevent further rusting, the reaction product of said citric acid and said chloride with the rust remaining within said coating of said film-forming material, the amount of said film-forming material being in the range of about 50–75%, the amount of said citric acid being in the range of about 20–30%, and the amount of said chloride being in the range of about 10–20%, all percentages being by weight on a dry basis of the mixture of said film-forming material, citric acid, and chloride.

2. An anti-rust composition according to claim 1, wherein the metal chloride is zinc chloride.

3. An anti-rust composition according to claim 1, wherein the film-forming material is an acrylic polymer.

4. An anti-rust composition according to claim 3, wherein the film-forming material is a styrene-modified acrylic resin.

5. A method of inactivating and preventing further rusting of a rusted iron substrate, comprising applying to the substrate the composition of claim 1.

6. An iron metal surface containing rust and having thereon a tough durable adherent coating obtained by applying the composition of claim 1 to said surface.

7. The iron metal surface of claim 6 wherein said film-forming material is an acrylic polymer.

* * * * *